Patented Jan. 25, 1927.

1,615,770

UNITED STATES PATENT OFFICE.

JEAN PAISSEAU, OF COURBEVOIE, FRANCE.

PROCESS FOR THE PREPARATION OF PEARL ESSENCE.

No Drawing. Application filed August 19, 1924, Serial No. 733,018, and in France September 15, 1923.

In the patent application filed the 10th of August, 1921, Serial No. 491,310, applicant described a process for purifying pearl essence according to which the said essence is mixed with a substance capable of destroying the protoplasmic substances in which the crystalloids or brilliant particles of the essence are included and which conceal their brilliancy, after the stirring of the mixture, the denudated brilliant particles are separated from the impure liquid by sedimentation, centrifugation or other means. Applicant cited some detersive agents, such as saponine, neutral soap, benzin, etc.

The present invention has for its object a process for purifying pearl essence analogous to the above process, but which is based upon the use of other substances which are capable of reducing the surface tension of the constitutive liquid of pearl essence. Due to the addition of such substances, the liquid becomes capable of perfectly moistening the particles which it contains in suspension so that, under the influence of the stirring, the said particles become perfectly deterged.

By way of example, a certain number of solutions which are particularly easy to prepare are indicated as follows:

(1) *Bile solution.*

Bile (from the pig), 0.5 to 1 gram; water, 1 litre. A hot solution is to be preferably made.

(2) *Sodium or ammonium sulpho-ricinate solution.*

Sulphoricinate, 2 grams; water, 1 litre.

(3) *Ethyl alcohol solution.*

Saponine, 0.5 gram; alcohol (approx.), 1 litre.

(4) *Albuminous solution.*

White of the egg (or the like), 1 gram; water, 1 litre.

The above-mentioned proportions will vary with the source of the products, and it is preferable to verify in all cases in practice the surface tension which is obtained by the known method of counting the drops.

Claims:—

1. A process for the preparation and purifying of pearl essence by detersion of the crystalloids, consisting in mixing the said pearl essence with a substance which is capable of reducing the surface tension of the liquid to such a value that the said liquid will perfectly moisten the constitutive crystalloids of pearl essence, then in stirring the mixture and in separating the crystalloids from the impure liquid.

2. A process for the preparation and purifying of pearl essence by detersion of the crystalloids, consisting in mixing sulforicinates with the said essence in order to bring the surface tension to such a value that the said liquid will perfectly moisten the constitutive crystalloids of pearl essence, then in stirring the mixture and in separating the crystalloids from the impure liquid.

In testimony that I claim the foregoing as my invention, I have signed my name.

JEAN PAISSEAU,